United States Patent
Ehrhardt et al.

(10) Patent No.: US 11,705,724 B2
(45) Date of Patent: Jul. 18, 2023

(54) LIGHTNING PROTECTION SPARK GAP ASSEMBLY AND METHOD FOR OPERATING A LIGHTNING PROTECTION SPARK GAP ASSEMBLY

(71) Applicant: DEHN SE, Neumarkt (DE)

(72) Inventors: Arnd Ehrhardt, Neumarkt (DE); Klaus Bühler, Neumarkt (DE)

(73) Assignee: DEHN SE, Neumarkt i.d. OPf. (DE)

( * ) Notice: Subject to any disclaimer, the term of this patent is extended or adjusted under 35 U.S.C. 154(b) by 71 days.

(21) Appl. No.: 17/606,930

(22) PCT Filed: May 7, 2020

(86) PCT No.: PCT/EP2020/062652
§ 371 (c)(1),
(2) Date: Oct. 27, 2021

(87) PCT Pub. No.: WO2020/225340
PCT Pub. Date: Nov. 12, 2020

(65) Prior Publication Data
US 2022/0208498 A1    Jun. 30, 2022

(30) Foreign Application Priority Data

May 9, 2019   (DE) ..................... 10 2019 206 730.1
Jul. 10, 2019  (DE) ..................... 10 2019 210 236.0

(51) Int. Cl.
*H02H 9/04*    (2006.01)
*H01H 85/02*   (2006.01)
(Continued)

(52) U.S. Cl.
CPC ........ *H02H 9/041* (2013.01); *H01H 85/0039* (2013.01); *H01H 85/0241* (2013.01);
(Continued)

(58) Field of Classification Search
CPC ............ H01H 39/006; H01H 85/0039; H01H 85/306; H01H 85/38; H01H 85/0241;
(Continued)

(56) References Cited

U.S. PATENT DOCUMENTS

| 2,305,436 A | 12/1942 | McMorris ................. 337/30 |
| 3,700,970 A | 10/1972 | Miyoshi ................. 361/115 |

(Continued)

FOREIGN PATENT DOCUMENTS

| DE | 128433 C   | 2/1902 | ............. H01T 4/14 |
| DE | 1064613 B  | 9/1959 | ............. H01H 39/00 |

(Continued)

OTHER PUBLICATIONS

Machine translation of Ehrhardt et al. German Patent Document DE 102017119285 A1 Aug. 2, 2018 (Year: 2018).*

(Continued)

*Primary Examiner* — Kevin J Comber
(74) *Attorney, Agent, or Firm* — Bodner & O'Rourke, LLP; Gerald T. Bodner; Christian P. Bodner (57) ABSTRACT

A lightning protection spark gap assembly comprises: a lighting protection spark gap having a first main connection and a second main connection, wherein a first voltage line of a supply network is connectable to the first main connection and a second voltage line of the supply network is connectable to the second main connection; a safety fuse device which is triggerable and which is connectable between the first or second voltage line and the corresponding main connection of the lightning protection spark gap, wherein at least one current path leading via the lighting protection spark gap is formable between the first voltage line and the second voltage line during operation; an indicator device for detecting a current flow in the current path or a corresponding portion of the current flow in the current path and for (Continued)

mechanically or electrically delayed triggering of the safety fuse device.

30 Claims, 8 Drawing Sheets (51) Int. Cl.
    *H01H 85/30* (2006.01)
    *H01H 85/38* (2006.01)
    *H01T 1/14* (2006.01)
    *H01H 85/00* (2006.01)
    *H01T 1/02* (2006.01)

(52) U.S. Cl.
    CPC .......... *H01H 85/306* (2013.01); *H01H 85/38* (2013.01); *H01T 1/02* (2013.01); *H01T 1/14* (2013.01); *H01H 2085/381* (2013.01)

(58) Field of Classification Search
    CPC ....... H01H 2085/381; H01T 1/02; H01T 1/14; H01T 2/02; H01T 4/14; H02H 9/041
    USPC .......................................................... 361/104
    See application file for complete search history.

(56) References Cited

U.S. PATENT DOCUMENTS

| | | | |
|---|---|---|---|
| 4,710,847 A | 12/1987 | Kortschinski et al. | 361/125 |
| 4,807,082 A | 2/1989 | Ranjan et al. | 361/104 |
| 5,406,438 A | 4/1995 | Ranjan et al. | 361/104 |
| 9,083,153 B2 | 7/2015 | Ehrhardt et al. | |
| 9,691,560 B2 | 6/2017 | Zahlmann et al. | |
| 9,871,368 B2 | 1/2018 | Buhler et al. | |
| 2009/0021881 A1 | 1/2009 | Crevenat | 361/111 |
| 2013/0063845 A1 | 3/2013 | Durth et al. | 361/56 |
| 2017/0236674 A1* | 8/2017 | Durth | H01H 85/38 337/31 |
| 2019/0371561 A1 | 12/2019 | Ehrhardt et al. | |

FOREIGN PATENT DOCUMENTS

| | | | | |
|---|---|---|---|---|
| DE | 1180451 B | 10/1964 | ........... | H01H 85/044 |
| DE | 1904244 A1 | 8/1970 | ............ | H01H 39/00 |
| DE | 102005024658 B4 | 2/2007 | ............... | H01T 1/10 |
| DE | 102008047256 A1 | 3/2010 | ............ | H01H 39/00 |
| DE | 202009018086 U1 | 2/2011 | ............... | H01C 7/12 |
| DE | 102011051738 A1 * | 2/2012 | ............... | H01T 4/14 |
| DE | 102011051738 A1 | 2/2012 | ............... | H01T 1/08 |
| DE | 102011118713 A1 | 9/2012 | ............ | H01H 19/56 |
| DE | 102012112480 A1 | 5/2014 | ............ | H01T 15/00 |
| DE | 102014215282 B3 * | 10/2015 | ............ | H01H 85/44 |
| DE | 102014215282 B3 | 10/2015 | ............ | H01H 85/44 |
| DE | 102017119285 A1 * | 8/2018 | ........... | H01H 39/006 |
| DE | 102017119285 A1 | 8/2018 | ............ | H01H 85/36 |
| DE | 102017126419 A1 | 8/2018 | ............ | H01H 39/00 |
| EP | 3166193 A1 | 5/2017 | ............ | H01H 79/00 |
| WO | WO2006128761 A1 | 12/2006 | ............... | H01T 2/02 |
| WO | WO2013117176 A1 | 8/2013 | ............... | H01T 1/14 |
| WO | WO2014005747 A1 | 1/2014 | ............ | H01T 15/00 |

OTHER PUBLICATIONS

Machine translation of Ehrhardt et al. German Patent Document DE 102011051738 A1 Feb. 9, 2012 (Year: 2012).*

Machine translation of Durth et al. German Patent Document DE 102014215282 B3 Oct. 1,2015 (Year: 2015).*

The Notification Concerning Transmittal of International Preliminary Report on Patentability (Chapter I of the Patent Cooperation Treaty), in English, dated Nov. 18, 2021, which was issued by the International Bureau of WIPO in Applicant's related international PCT application having Serial No. PCT/EP2020/062651, filed on May 7, 2020.

The English translation of the International Preliminary Report on Patentability (Chapter I of the Patent Cooperation Treaty), dated Nov. 2, 2021, which was issued by the International Bureau of WIPO in Applicant's related international PCT application having Serial No. PCT/EP2020/062651, filed on May 7, 2020.

The Written Opinion of the International Searching Authority, in English, dated Jul. 24, 2020, which was issued by the International Bureau of WIPO in Applicant's related international PCT application having Serial No. PCT/EP2020/062651, filed on May 7, 2020.

The International Search Report, in English, dated Jul. 24, 2020, which was issued by the International Bureau of WIPO in Applicant's related international PCT application having Serial No. PCT/EP2020/062651, filed on May 7, 2020.

The Notification Concerning Transmittal of International Preliminary Report on Patentability (Chapter I of the Patent Cooperation Treaty), in English, dated Nov. 18, 2021, which was issued by the International Bureau of WIPO in Applicant's corresponding international PCT application having Serial No. PCT/EP2020/062652, filed on May 7, 2020.

The English translation of the International Preliminary Report on Patentability (Chapter I of the Patent Cooperation Treaty), dated Nov. 2, 2021, which was issued by the International Bureau of WIPO in Applicant's corresponding international PCT application having Serial No. PCT/EP2020/062652, filed on May 7, 2020.

The Written Opinion of the International Searching Authority, in English, dated Jul. 30, 2020, which was issued by the International Bureau of WIPO in Applicant's corresponding international PCT application having Serial No. PCT/EP2020/062652, filed on May 7, 2020.

The International Search Report, in English, dated Jul. 30, 2020, which was issued by the International Bureau of WIPO in Applicant's corresponding international PCT application having Serial No. PCT/EP2020/062652, filed on May 7, 2020.

An Office Action (in German), dated Feb. 28, 2020, issued by the German Patent Office for Applicant's related German Patent Application No. DE102019210234.4, filed Jul. 10, 2019.

* cited by examiner

LIGHTNING PROTECTION SPARK GAP ASSEMBLY AND METHOD FOR OPERATING A LIGHTNING PROTECTION SPARK GAP ASSEMBLY

The present invention relates to a lightning protection spark gap assembly and to a method for operating a lightning protection spark gap assembly.

PRIOR ART

DE 10 2017 126 419 A1 and DE 10 2017 119 285 A1 disclose triggerable fusible links which have a bridge igniter as an actuator, for example. The present invention describes methods for activating the bridge igniter in the case of erroneous power follow currents when using the fusible links as a protection apparatus for lightning protection spark gaps.

Triggerable fusible links are usually activated by thermally overloading an auxiliary fusible conductor which is generally used to activate a reactive substance (explosive, exothermic mass, gas production etc.). The activation is often carried out by means of direct load variables or by means of independent signaling from the outside or in combination.

According to DE 1 064 613, such a fuse is triggered, for example, by its own voltage drop on account of a particular current level or a particular current rise by virtue of a voltage-dependent switch causing a current to flow via an auxiliary fusible conductor for the purpose of igniting an explosive mass which destroys the main fusible conductor.

According to DE 1 904 244, a corresponding auxiliary fusible conductor for igniting an explosive charge is activated in an isolating device via a transformer which is controlled on the basis of the current intensity, the current rise, the voltage or the voltage rise etc.

DE 10 2008 047 256 A1 discloses a triggerable fuse which can likewise be actuated by an explosive charge. In addition to activation possibilities from an electronic control unit which evaluates direct load variables such as current load etc., this assembly also has a control input for external signals. Therefore, the devices to be protected can automatically detect virtually any desired and specific load criteria and can activate the overcurrent protection device independently of the pure current load. Secondary effects of a current or voltage load, for example reduced insulation values, leakage fault currents with a temperature increase or risk of fire, arc faults etc., can therefore also be used for triggering, possibly even before damage occurs with a short-circuit current.

U.S. Pat. No. 2,305,436 discloses the use of a triggerable disconnecting apparatus in combination with a lightning arrester. If the arrester is loaded with pulse currents, the auxiliary fusible conductor is scarcely loaded with a surrounding explosive charge. The propellant charge is ignited only in the case of network-frequency currents with the aid of a frequency divider by heating a heating wire.

U.S. Pat. No. 4,807,082 discloses an activation device for a chemically triggerable fuse. The activation device is passivated by a protection device in the case of transient loads.

DE 20 2009 018 086 discloses a surge arrester having a pyrotechnic disconnecting apparatus which can be activated directly, in particular, by undesirable arcs occurring at the surge arrester and by conventional criteria for assessing the load state of a surge arrester by means of a controller and its signaling.

DE 10 2005 024 658 B4 discloses a lightning protection spark gap which uses the hard gas principle to produce a high pressure for follow current avoidance or quenching. POM (polyoxymethylene), for example, is used as the substance which emits hard gas. Such lightning protection spark gaps are subject to wear in the case of arc loads. If the wear of the substance emitting hard gas exceeds a certain limit, the ability to quench the follow current falls.

DISCLOSURE OF THE INVENTION

The present invention provides a lightning protection spark gap assembly as claimed in claims 1 and 26 and a method for operating a lightning protection spark gap assembly as claimed in claim 20.

The respective subclaims relate to preferred developments.

Advantages of the Invention

The essence of the invention is to monitor or assess the reduction in the functionality of lightning protection spark gaps, for example as a result of aging or overloading, for the purpose of disconnection in good time by triggering a fusible link device.

When lightning protection spark gaps respond as a result of a lightning strike, after the pulse currents have been discharged, power follow currents caused by the network voltage of the supply network may arise. On account of the high current limitation of these currents by the quenching chamber or a quenching gas, the amplitude of the power follow currents, inter alia, is considerably lower than the amplitude of the pulse currents. As a result of the high current limitation, the duration of the power follow currents is also likewise limited to 1 ms to a few ms.

The duration of the power follow currents in the case of a normal function of the lightning protection spark gaps is therefore in the region of the duration of high-energy pulse current loads and the level is lower than the level of the pulse loads. The specific energy of a power follow current is likewise lower than the specific energy of the pulse current which is in the operating range of the respective lightning protection spark gap.

Conventional solutions which are aimed, for example, at the current level, current rate of rise, voltage level, voltage rate of rise for the purpose of triggering a bridge igniter are unsuitable because there is only matching to the transient pulse load here in the case of overvoltage devices since these values are all considerably lower in the power follow current than transient load variables which must be repeatedly mastered by the devices without being disconnected. Since the duration of the power follow current and the pulse load is also similar, only very long durations can be considered to be erroneous.

As a result of the fact that the indicator device according to one aspect of the invention has an electrical or mechanical delay, the pulse current and the power follow current can be spatially and temporally separated and the fusible link device can nevertheless be quickly triggered after 1 ms to a few ms, for example.

The invention therefore advantageously enables virtually delay-free triggering in the case of fault states irrespective of preceding impressed pulse currents. Control is not effected during the pulse current since otherwise the lightning protection spark gap assembly could be overloaded and there would be a danger caused by excessively fast actuation.

The solution according to the invention is simple and cost-effective and protects the lightning protection spark gaps from overloading by electrically activating the disconnection with an electrical or mechanical delay. Disconnection is achieved both in the event of danger caused by pulse currents and in the event of danger caused by leakage and power follow currents.

In the case of one-off pulse current loads above the operating range of the lightning protection spark gap, disconnection is already effected by the passive response (fusing) of the triggerable fusible link as a result of the $I^2t$ load of the pulse. Triggering is therefore avoided during the pulse current duration. The triggerable fusible link without triggering is therefore already a fully functional fuse with a passive time/current characteristic curve.

Additional control in the case of conventional secondary load variables of the lightning protection spark gap or its components, such as temperature, voltage, pressure, leakage current, expansion etc., or a change in these variables, is easily possible with separate mechanical triggering or other coupling.

As a result of the fact that the indicator device according to a further aspect of the invention has, beside an arc region, at least one region which emits hard gas and in which a probe device is provided as an indicator device, it is possible to trigger the fusible link device if the region which emits hard gas is degraded such that the arc can make electrical contact with the probe device. In this further aspect, direct triggering by the arc therefore takes place in the case of aging by means of the probe device as an indicator device, wherein the delay can be electrically set by means of a resistor.

According to one preferred embodiment, the lightning protection spark gap assembly has a trigger connection, wherein the at least one current path comprises a trigger current path which leads via the trigger connection.

According to a further preferred embodiment, the indicator device comprises a first indicator device for capturing a current profile in the trigger current path or a corresponding portion of the current profile in the trigger current path and for triggering the fusible link device with a delay via a mechanical switch device if the captured current profile in the trigger current path or the corresponding portion of the current profile in the trigger current path satisfies a predefined first criterion. This makes it possible to detect aging of the lightning protection spark gap via the trigger current path.

According to a further preferred embodiment, the at least one current path comprises a main current path which leads via the first main connection and the second main connection.

According to a further preferred embodiment, the indicator device comprises a second indicator device for capturing a current profile in the main current path or a corresponding portion of the current profile in the main current path and for triggering the fusible link device with a delay via the mechanical switch device if the captured current profile in the main current path or the corresponding portion of the current profile in the main current path satisfies a predefined second criterion. This makes it possible to detect fault states via the main current path.

According to a further preferred embodiment, the indicator device has an indicator fuse which can be used to actuate a mechanical actuator, wherein the switch device can be closed by the mechanical actuator in order to trigger the fusible link device. The mechanical delay can thus be set up via the actuator.

According to a further preferred embodiment, a frequency-dependent current divider is connected in parallel with the indicator fuse or is part of the latter. This makes it possible to decouple pulse currents from power follow currents with corresponding impedance matching.

According to a further preferred embodiment, a further indicator fuse is connected in parallel with the indicator fuse. This likewise makes it possible to decouple pulse currents from power follow currents with corresponding impedance matching.

According to a further preferred embodiment, the current level and the current duration of the current profile or of the corresponding portion of the current profile are included in the predetermined criterion, wherein, in particular, the current level is included quadratically and the current duration is included linearly in the predefined criterion or the first and/or second predefined criterion.

According to a further preferred embodiment, the triggering of the fusible link device is delayed by a predefined period which is selected in such a manner that a pulse current has substantially decayed before the fusible link device is triggered.

According to a further preferred embodiment, the predefined period is in the range of 1 ms to 5 ms.

According to a further preferred embodiment, the switch device for triggering the fusible link device can be closed by an indicator device for a secondary parameter of the lightning protection spark gap, in particular light properties, for example intensity or spectral properties, of the arc, temperature, pressure or expansion. This makes it possible to use further activation criteria to increase safety.

According to a further preferred embodiment, the lightning protection spark gap has, beside an arc region, at least one region which emits hard gas and in which a probe device is provided as a further indicator device, which probe device makes it possible to trigger the fusible link device if the region which emits hard gas is degraded such that the arc can make electrical contact with the probe device. This makes it possible to detect fault states via the erosion of the substance which emits hard gas.

According to a further preferred embodiment, the probe device has a first contact and a second contact which is arranged at a distance from the first contact.

According to a further preferred embodiment, a fusible wire is provided between the first contact and the second contact.

According to a further preferred embodiment, the probe device has an individual contact.

According to a further preferred embodiment, the fusible link device is connected to the probe device in such a manner that it can be directly activated by a voltage tapped off from the arc at the probe device.

According to a further preferred embodiment, the fusible link device has a bridge igniter which can be used to trigger it.

According to a further preferred embodiment, the indicator device has an indicator fuse, which can be used to decouple the trigger current path from one of the first or second voltage line, wherein an electrically delaying bypass is connected from the other of the first or second voltage line via the triggerable fusible link device, with the result that the fusible link device can be triggered in the decoupled state.

BRIEF DESCRIPTION OF THE DRAWINGS

In the drawings.

In the figures, identical or functionally identical elements are provided with the same reference signs.

DESCRIPTION OF THE EXEMPLARY EMBODIMENTS

Figure 1:
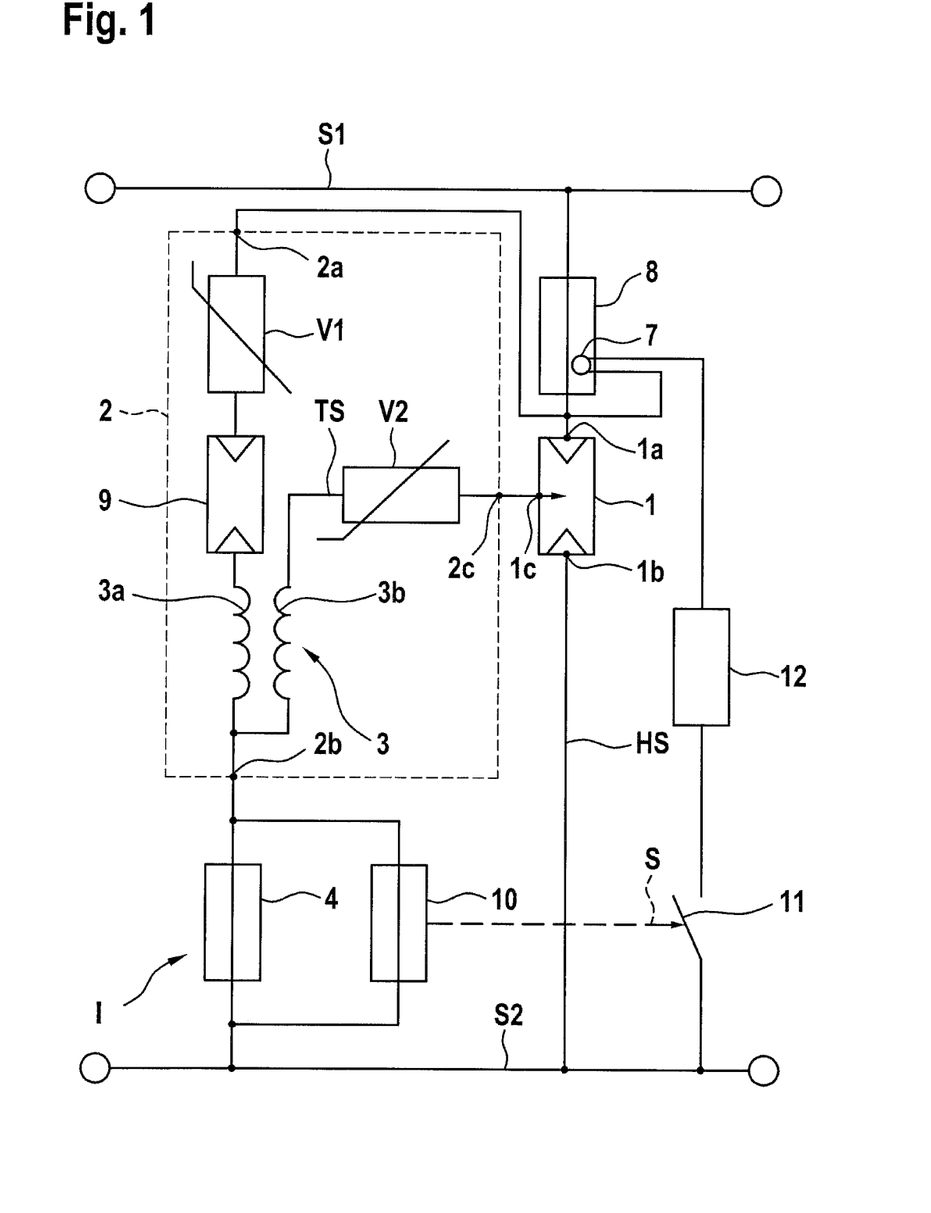
FIG. 1 shows a circuit diagram for explaining a lightning protection spark gap assembly according to a first embodiment of the present invention.

FIG. 1 shows a circuit diagram for explaining a lightning protection spark gap assembly according to a first embodiment of the present invention.

In FIG. 1, reference sign 1 denotes a lightning protection spark gap having a first main connection 1a and a second main connection 1b. The lightning protection spark gap also has a trigger connection 1c, connected upstream of which is a trigger circuit 2 for reducing the response voltage. The trigger circuit 2 is also connected to the first and second main connections 1a, 1b.

A first voltage line S1 of a supply network can be connected to the first main connection 1a via a fusible link device 8 which can be triggered by a bridge igniter 7, and a second voltage line S2 of the supply network can be connected to the second main connection 1b.

In this example, the inherent fusible function of the fusible link device 8 is used to disconnect the overvoltage protection device in the case of pulse current loads which exceed the proven nominal value of the device, for example a lightning current of 25 kA for a network arrester.

The bridge igniter 7 is connected, on the one hand, to the first main connection 1a and, on the other hand, to the second voltage line S2 via a current limiting resistor 12 and a controllable switch device 11.

The trigger circuit 2 has a first connection 2a, a second connection 2b and a third connection 2c. The first connection 2a is connected to the first main connection 1a, the second connection 2b is connected to the second voltage line S2 via an indicator device I, and the third connection 2c is connected to the trigger connection 1c of the lightning protection spark gap 1.

The trigger circuit 2 comprises a first current limiter V1, for example a first varistor, which is connected to the indicator device I via a voltage-switching component 9, for example a spark gap with a lower response voltage than the lightning protection spark gap 1, and a primary winding 3a of a transformer 3. The trigger circuit 2 comprises a second current limiter V2, for example a second varistor, which is connected, on the one hand, to the third connection 2c and therefore to the trigger connection 1c. On the other hand, the second current limiter is connected to the second connection 2b and therefore to the indicator device I via the secondary winding 3b of the transformer 3.

In another embodiment (not illustrated), the trigger circuit 2 may also be in the form of current triggering without a transformer 3.

The load of the trigger circuit 2 is matched to the performance of the lightning protection spark gap 1 in such a manner that, in the case of excessively high pulse loads or excessively high rates of rise of the pulse and in the case of excessively long ignition delay times of the lightning protection spark gap 1, an excessively high or excessively long current load occurs in the trigger circuit 2. The current load also increases in the case of faults in components of the trigger circuit 2, which may result in overloading of the indicator device I.

The indicator device I comprises a first fusible link 4 with a high current-carrying capacity and a second fusible link 10 with a low current-carrying capacity, also referred to as an indicator fuse, which is connected in parallel with the first fusible link 4. Both fusible links 4, 10 can also be integrated in a single component.

If the trigger circuit 2 is overloaded with an excessively high current, an excessively long current flow direction or excessive heating of the components, the indicator device I responds. The first fusible link 4 may also age as a result of frequent pulses and loads, in particular in the case of a fusible conductor or its fastening using low-temperature solder, with the result that a response according to a state of wear of the trigger circuit 2 and of the lightning protection spark gap 1 is also possible.

When the indicator device I responds, the trigger path is interrupted with respect to the driving voltage of the network, wherein the first fusible link 4 is triggered first and then the second fusible link 10 as an indicator fuse.

In this case, the second fusible link 10 has the actuation force for an actuator S, for example a short-stroke button, of the switch device 11, which triggers the bridge igniter 7, thus making it possible to reduce the requirements for insulation imposed on the bridge igniter 7 in the triggerable fusible link device 8.

The delay time between the triggering of the first fusible link 4 and the current flow through the auxiliary fusible conductor of the bridge igniter 7 can be set in a wide range by selecting the switch device 11 and the second fusible link device 10, inter alia with respect to the travel, force and mass. The current flow via the switch device 11 and the bridge igniter 7 does not require any significant control and is imperatively not used to control the delay time. The mechanical delay time is preferably set in such a manner that a current flow via the bridge igniter is delayed by at least 1 ms with respect to the triggering of the indicator device I.

The current flowing via the connection 2a and, in particular, also via the trigger connection 2c is therefore functionally assessed or captured by the indicator device I which is configured such that it triggers the triggerable fusible link device 8 by activating the bridge igniter 7 if the captured current flowing via the trigger connection 2c or a corresponding portion of said current satisfies a first predefined criterion.

The first predetermined criterion is preferably an $I^2t$ criterion of the current flowing via the trigger connection 2c, in which the current level is included quadratically and the current duration is included linearly.

The exact stipulation of the first predetermined criterion, for example as an $I^2t$ criterion, depends on the respective design of the lightning protection spark gap 1 and the further boundary conditions and can be empirically and/or theoretically determined in the individual case.

Figure 2:
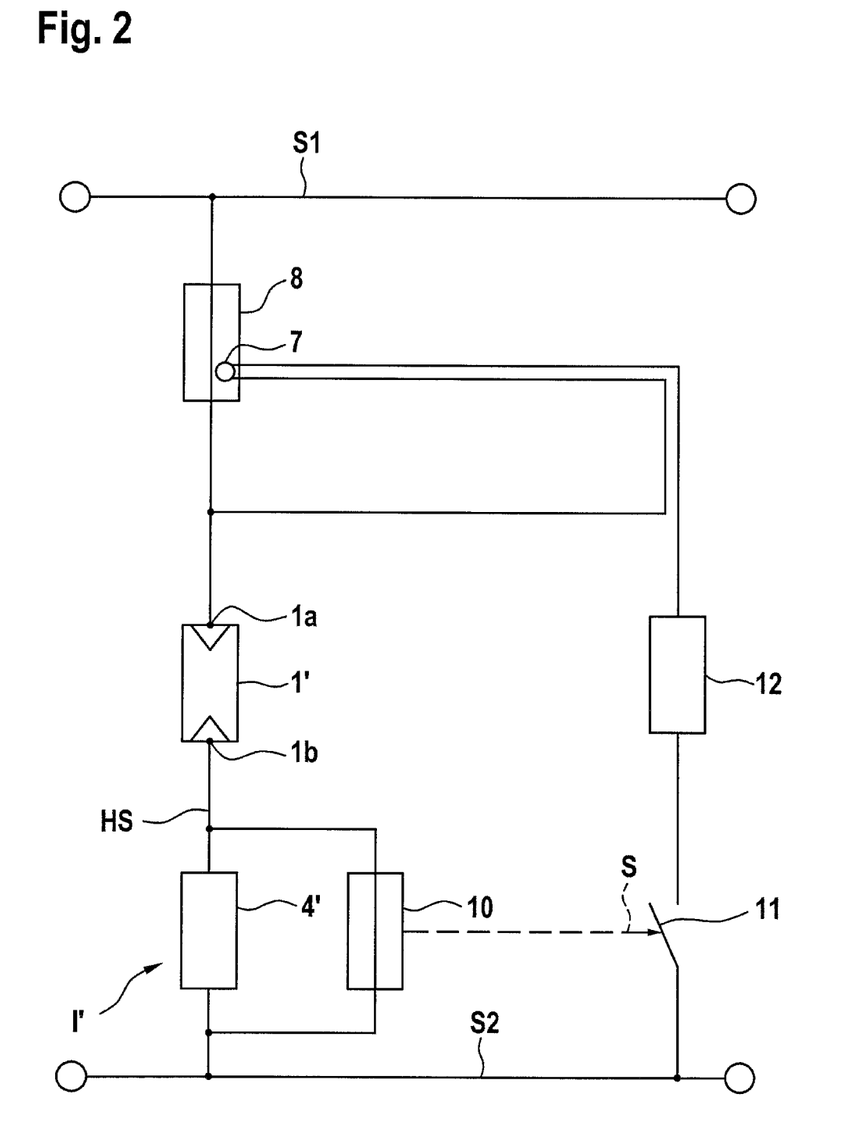
FIG. 2 shows a circuit diagram for explaining a lightning protection spark gap assembly according to a second embodiment of the present invention.

FIG. 2 shows a circuit diagram for explaining a lightning protection spark gap assembly according to a second embodiment of the present invention.

In the second embodiment, the lightning protection spark gap 1' is designed without a trigger connection 1c and without a trigger circuit 2.

The indicator device I' is incorporated here in the main current path of the lightning protection spark gap 1' and is in series with the lightning protection spark gap 1' between the second main connection 1b and the second voltage line S2. It comprises an indicator fuse 10, in parallel with which is connected a frequency-dependent current divider 4' or, for example, a PTC thermistor.

In the case of direct contact with the main current path, the impedance of the frequency-dependent current divider 4' should be matched to the impedance of the bypass of the indicator fuse 10. The partial current via the indicator fuse 10 can be selected to be very low in this case.

In the present embodiment, the indicator device I' is used to detect an excessively high pulse current load or an excessively frequent pulse current load of a particular level.

The triggering of the indicator device I' here again actuates the switch device 11 with the corresponding mechanical delay of 1 ms or more, for example. The switch device 11 connects the bridge igniter 7 of the triggerable fusible link device 8 to the network via the linear or non-linear resistor 12 or a capacitance which allows a current flow for triggering the auxiliary fusible conductor of the bridge igniter 7 of preferably between 1 and 10 A, but of a maximum of 100 A, for a short period of <5 ms. The control path with the bridge igniter 7, the resistor 12 and the switch device 11 is disconnected from the network by the triggerable fusible link device 8 according to its passive or active function.

The current flowing via the main current path is therefore functionally assessed or captured by the indicator device I' which is configured such that it triggers the triggerable fusible link device 8 by activating the bridge igniter 7 if the captured current flowing via the main current path or a corresponding portion of said current satisfies a second predefined criterion.

The second predetermined criterion is preferably likewise an $I^2t$ criterion of the current flowing via the main current path, in which the current level is included quadratically and the current duration is included linearly.

The exact stipulation of the second predetermined criterion, for example as an $I^2t$ criterion, depends on the respective design of the lightning protection spark gap 1 and the further boundary conditions and can be empirically and/or theoretically determined in the individual case.

The embodiment shows that it is possible to capture pulse currents with amplitudes or power follow currents with current durations which may damage the lightning protection spark gap 1' and to control the triggerable fusible link device 8 with a bridge igniter 7 with a simple mechanical time delay.

As an alternative (not illustrated) to the current assessment via the indicator fuse 10 and therefore energy of a partial current, it is also possible to directly use the forces on conductors, through which current flows, to unlock a spring system, which forces actuate a switch device with a time delay.

In the case of an existing energy supply or existing electronic control or evaluation units, it goes without saying that the capture or control can also be carried out on an electronic basis with a corresponding time delay using conventional current measurement methods and assessments.

Otherwise, the second embodiment is configured like the first embodiment.

Figure 3:
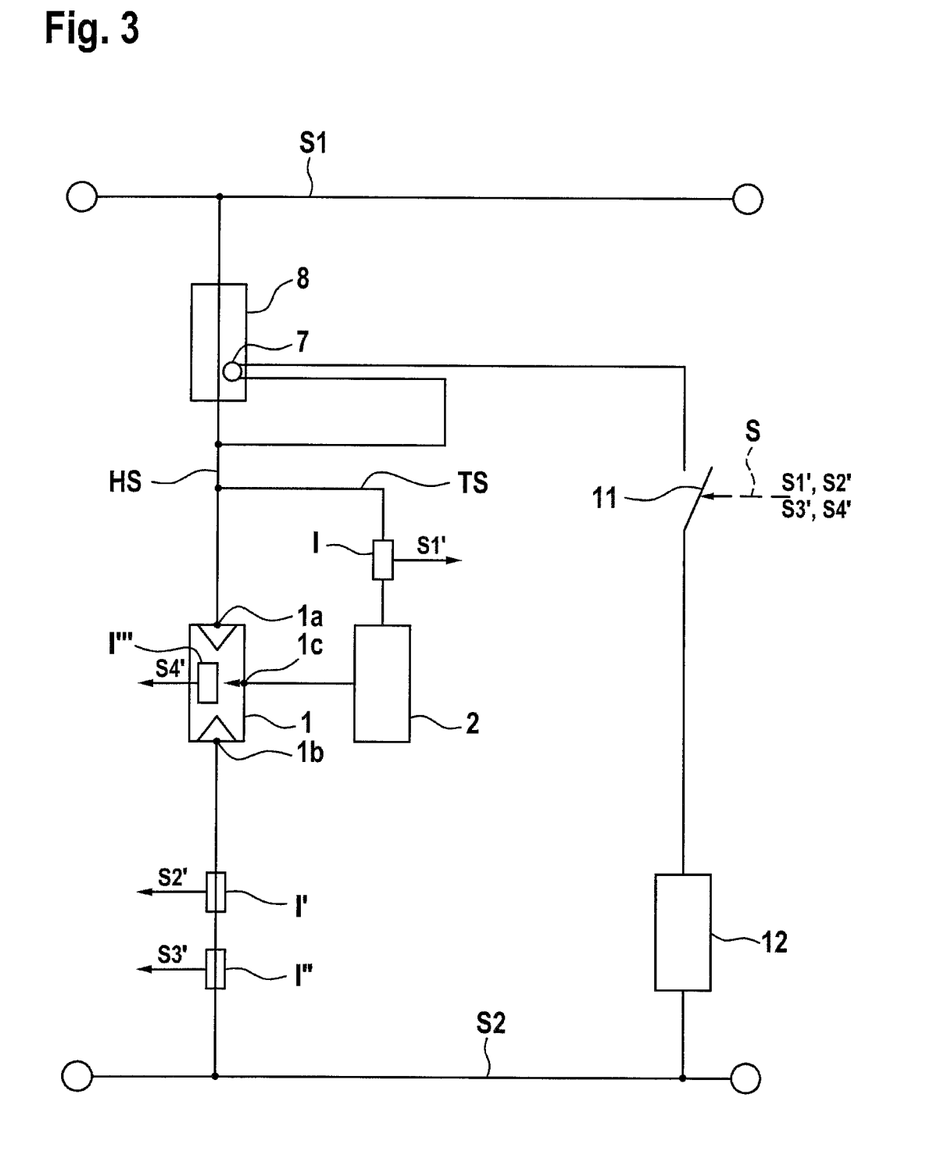
FIG. 3 shows a circuit diagram for explaining a lightning protection spark gap assembly according to a third embodiment of the present invention.

FIG. 3 shows a circuit diagram for explaining a lightning protection spark gap assembly according to a third embodiment of the present invention.

In addition to the two previously explained possibilities for actively controlling the triggerable fusible link device 8 in the event of overloading in the trigger path by means of the indicator device I in the first embodiment or in the event of overloading in the main current path by means of the indicator device I' in the second embodiment, for example taking a corresponding $I^2t$ criterion as a basis, certain specific properties of lightning protection spark gaps can also be additionally used for control. These properties may be based, for example, on a respective behavior of the spark gaps in the case of a follow current and a lightning current. The formation of an arc and the current path may therefore be different in the case of a follow current and a pulse current and may therefore enable separate use of additional sensors which can capture the behavior or deviations from the normal behavior.

In addition to the properties directly coupled to the arc, such as current, voltage, pressure, light etc., it is also possible to use the partly delayed effects of the arc such as heat, material erosion, material changes etc. This makes it possible to obtain a further triggering signal for controlling the switch device 11 from the behavior of the lightning protection spark gap.

FIG. 3 schematically shows this for the lightning protection spark gap 1 in the first embodiment.

The bridge igniter 7 of the triggerable fusible link device 8 is also controlled here via the mechanical switch device 11 with a mechanical delay on the basis of switching signals S1', S2', S3', S4', which originate from corresponding indicator devices I, I', I", I''', in an OR combination. In other words, each of the indicator devices I, I', I", I''' can trigger a switching operation and can therefore control the bridge igniter 7 if a corresponding predetermined criterion is satisfied.

In addition to the two previously explained possibilities for actively controlling the triggerable fusible link device 8 in the event of overloading in the trigger path by means of the indicator device I in the first embodiment by means of the switching signal S1' or in the event of overloading in the main current path by means of the indicator device I' in the second embodiment by means of the switching signal S2', a further switching signal S3' from capturing the temperature of an indicator device I" and yet another switching signal S4' from capturing the light of the arc of an indicator device I''' can be used to actuate the switch device 11 in order to control the bridge igniter 7.

It goes without saying that the further switching signal S3' from capturing the temperature of the indicator device I" and the further switching signal S4' from capturing the light of the arc of the indicator device I''' can also be used in the first embodiment to actuate the switch device 11. Further current capture possibilities (not illustrated) can also be implemented, for example using a magnetically triggerable reed contact.

Figure 4:
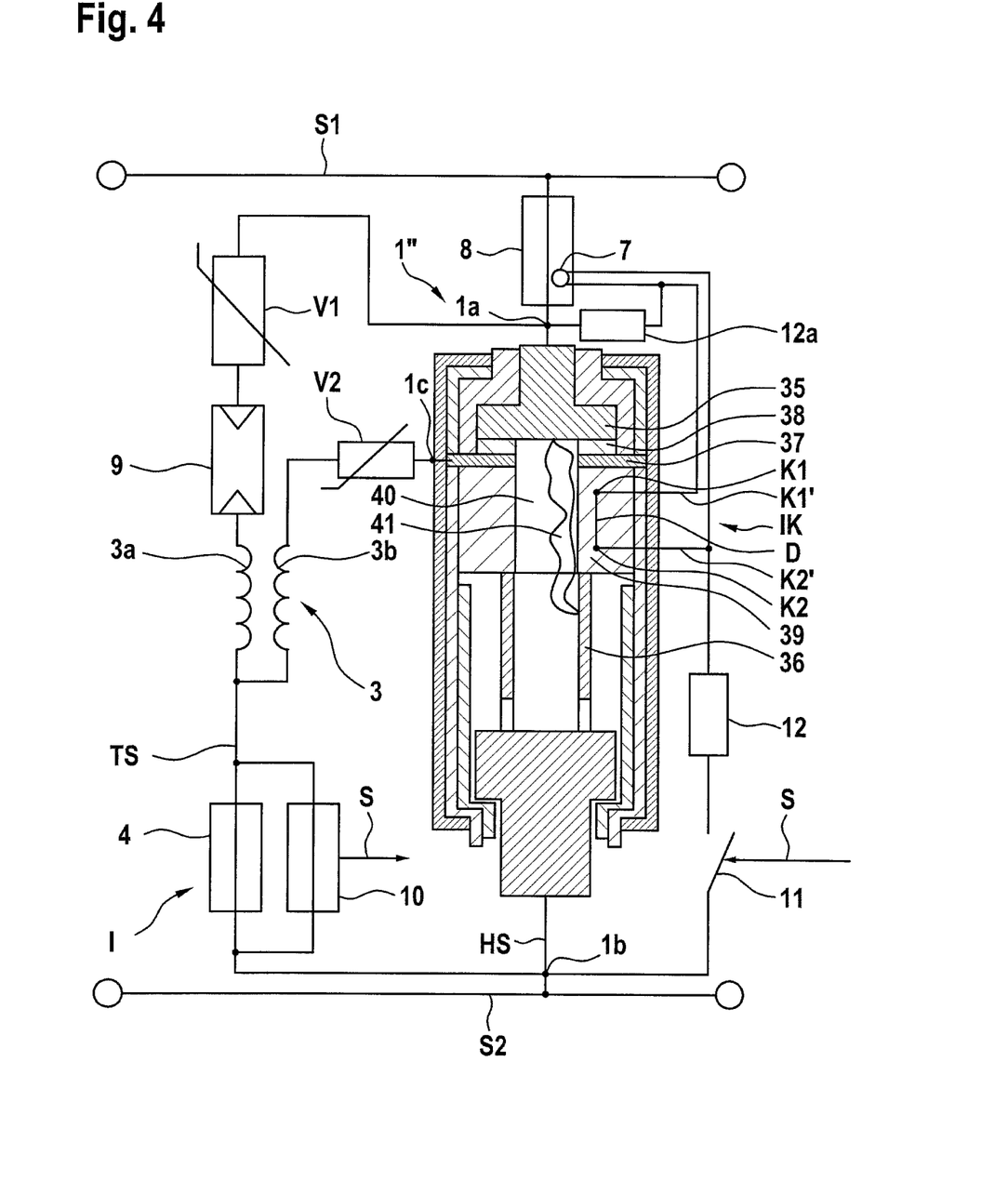
FIG. 4 shows a circuit diagram for explaining a lightning protection spark gap assembly according to a fourth embodiment of the present invention.

FIG. 4 shows a circuit diagram for explaining a lightning protection spark gap assembly according to a fourth embodiment of the present invention.

The structure of the lightning protection spark gap assembly according to FIG. 4 is similar to the structure of the lightning protection spark gap assembly according to FIG. 1.

The lightning protection spark gap 1" in the fourth embodiment corresponds, in principle, to the lightning protection spark gap with hard gas quenching known from DE 10 2005 024 658 B4. The indicator device I which assesses the current flowing via the trigger connection 1c and is intended to control the switch device 11 functions in the manner described in connection with the first embodiment.

The lightning protection spark gap 1" additionally has a probe device K1, K2, D as a further indicator device IK.

In at least one region, here in the regions 38, 39, the lightning protection spark gap 1" has a substance which emits hard gas and ages when loaded with an arc by virtue of the erosion of the latter. FIG. 4 illustrates, by way of example, two regions 38, 39 with a substance emitting hard gas which are each arranged between a main electrode 35, 36 and the trigger electrode 37.

The regions 38 and 39 may be composed of POM (polyoxymethylene), for example. A wire D or an electrically conductive strip, for example, is introduced into the region 39 and is at a defined distance from the arc region 41 of the spark gap chamber 40 within the region 39 and is arranged in a sandwich structure of the region 39 in a manner enclosed by the substance which emits hard gas.

In this case, the wire D connects two contacts K1, K2 which are preferably introduced vertically parallel to the arc region 41 in different positions and are directly connected to the bridge igniter 7 of the triggerable fusible link device 8 via connection lines K1', K2'. The regions 38, 39 may be electrically conductive. In this case, the connection lines K1', K2' should be provided in an insulated manner.

If the material which emits hard gas in the region 39 is eroded by the arc in the arc region 41 as far as the wire D, the latter is interrupted, as a result of which a voltage difference is tapped off by the two contacts K1, K2 at the arc, which causes a current for activating the bridge igniter 7.

This direct triggering of the bridge igniter 7 by the arc is used in this embodiment in combination with the switch device 11 which can be alternatively actuated by the indicator device I, as already described in detail. In the case of direct triggering by the arc, the resistor 12a electrically determines the delay.

Figure 5:
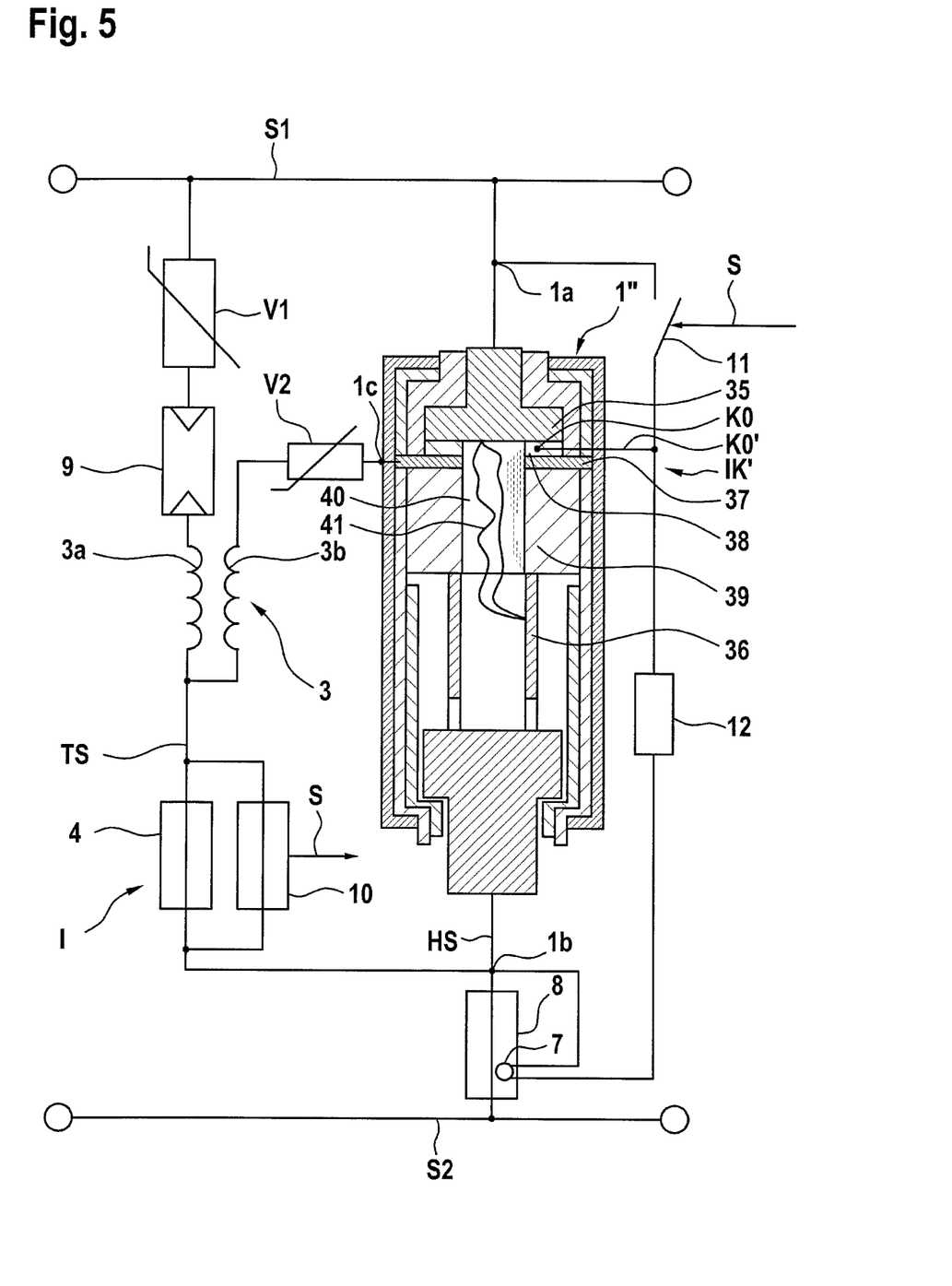
FIG. 5 shows a circuit diagram for explaining a lightning protection spark gap assembly according to a fifth embodiment of the present invention.

FIG. 5 shows a circuit diagram for explaining a lightning protection spark gap assembly according to a fifth embodiment of the present invention.

The lightning protection spark gap 1" in the fifth embodiment corresponds, in principle, to the lightning protection spark gap with hard gas quenching known from DE 10 2005 024 658 B4. The indicator device I which assesses the current flowing via the trigger connection 1c and is intended to control the switch device 11 functions in the manner described in connection with the first embodiment.

The only difference is that the triggerable fusible link device 8 is introduced between the second main connection 1b and the second voltage line S2 and the switch device 11 is connected to the first main connection 1a.

The lightning protection spark gap 1" additionally has a probe device K0 as a further indicator device IK'.

In contrast to the fourth embodiment, only a single contact K0 is introduced into the region 38 according to FIG. 5 and is connected to the bridge igniter 7 via the insulated connection line K0' and the resistor 12. If the contact K0 is reached by the arc as a result of the material erosion of the substance emitting hard gas in the region 38, the switch device 11 can be bridged and a partial current can flow from the main electrode 35, via the arc in the arc region 41 and the contact K0, directly to the bridge igniter 7 of the triggerable fusible link device 8 in order to activate said bridge igniter, wherein the resistor 12 influences the current flow and therefore the triggering time.

Figure 6:
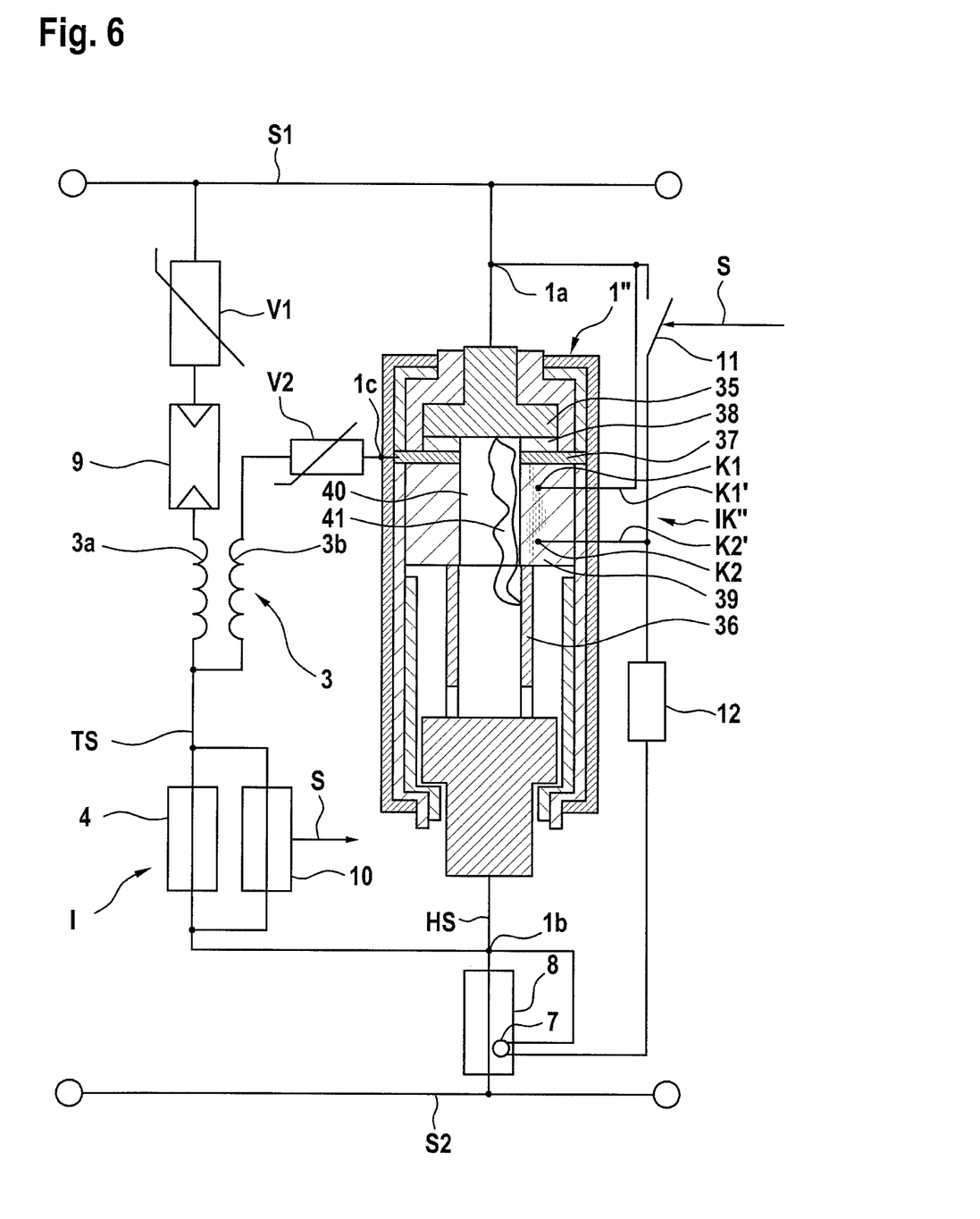
FIG. 6 shows a circuit diagram for explaining a lightning protection spark gap assembly according to a sixth embodiment of the present invention.

FIG. 6 shows a circuit diagram for explaining a lightning protection spark gap assembly according to a sixth embodiment of the present invention.

The lightning protection spark gap 1" in the sixth embodiment corresponds, in principle, to the lightning protection spark gap with hard gas quenching known from DE 10 2005 024 658 B4. The indicator device I which assesses the current flowing via the trigger connection 1c and is intended to control the switch device 11 functions in the manner described in connection with the first embodiment.

The only difference is that the triggerable fusible link device 8 is introduced between the second main connection 1b and the second voltage line S2 and the switch device 11 is connected to the first main connection 1a.

The lightning protection spark gap 1" additionally has a probe device K1, K2 as a further indicator device IK".

In contrast to the fourth embodiment, only the two contacts K1, K2 are introduced into the region 39 without a wire in between according to FIG. 6 and are connected in parallel with the switch device 11 via the connection lines K1', K2'. If the contacts K1, K2 are reached by the arc as a result of the material erosion of the substance emitting hard gas in the region 38, the switch device 11 can be bridged and a voltage difference which is tapped off by the two contacts K1, K2 at the arc can give rise to a current for activating the bridge igniter 7. The switch device 11 can be actuated irrespective of the aging, as already described above.

Figure 7:
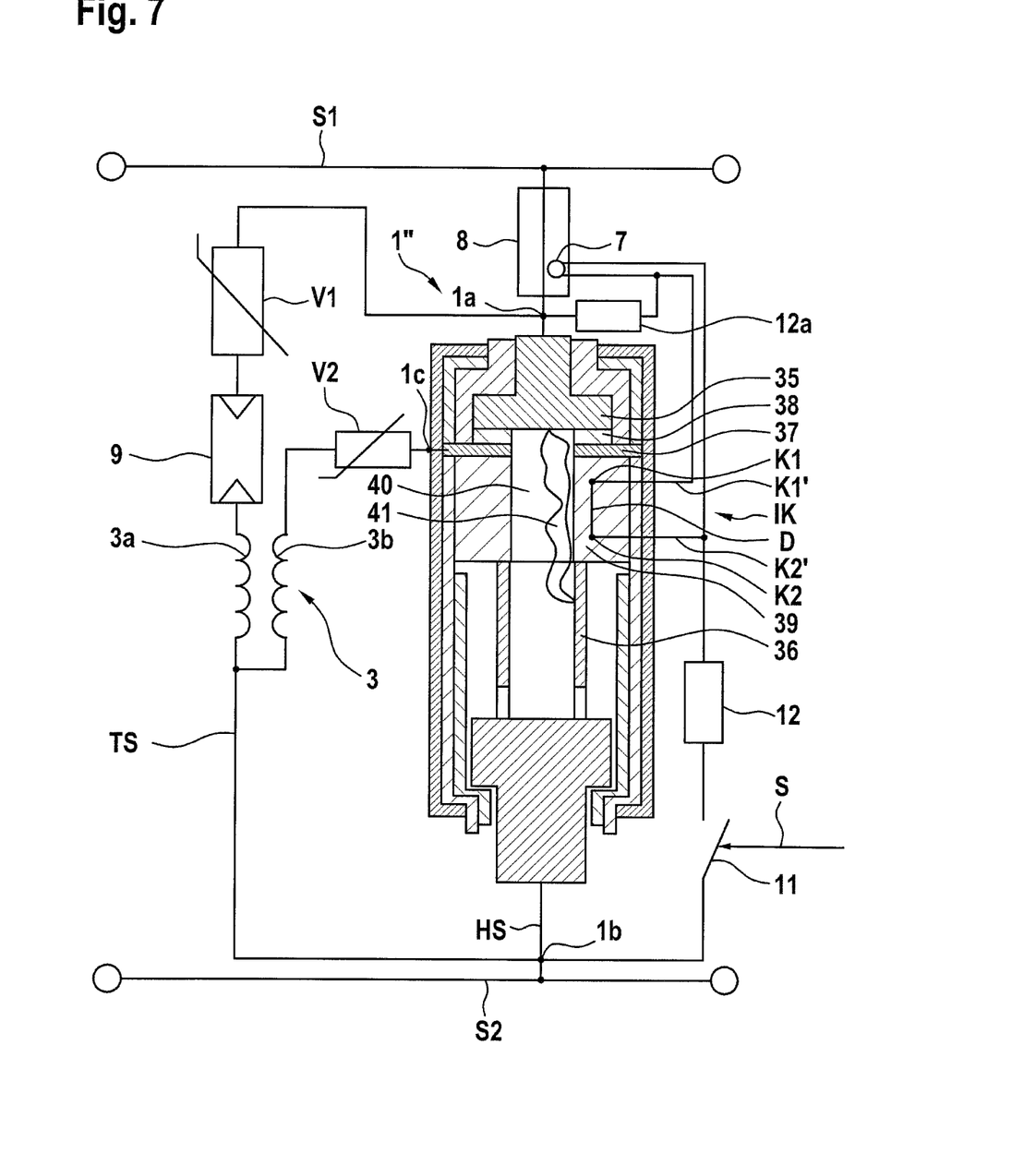
FIG. 7 shows a circuit diagram for explaining a lightning protection spark gap assembly according to a seventh embodiment of the present invention.

FIG. 7 shows a circuit diagram for explaining a lightning protection spark gap assembly according to a seventh embodiment of the present invention.

The seventh embodiment is constructed in a similar manner to the fourth embodiment, wherein the indicator device I and the switch device S have been omitted, with the result that only direct triggering of the bridge igniter 7 by the arc takes place by means of the indicator device IK in the case of aging, wherein the delay can be electrically set by the resistor 12.

In this case, it should be mentioned that the indicator device I and the switch device S can also be omitted in the fifth and sixth embodiments, with the result that only direct triggering of the bridge igniter 7 by the arc takes place by means of the indicator device IK' or IK" in the case of aging, wherein the delay can be electrically set by the resistor 12a.

Figure 8:
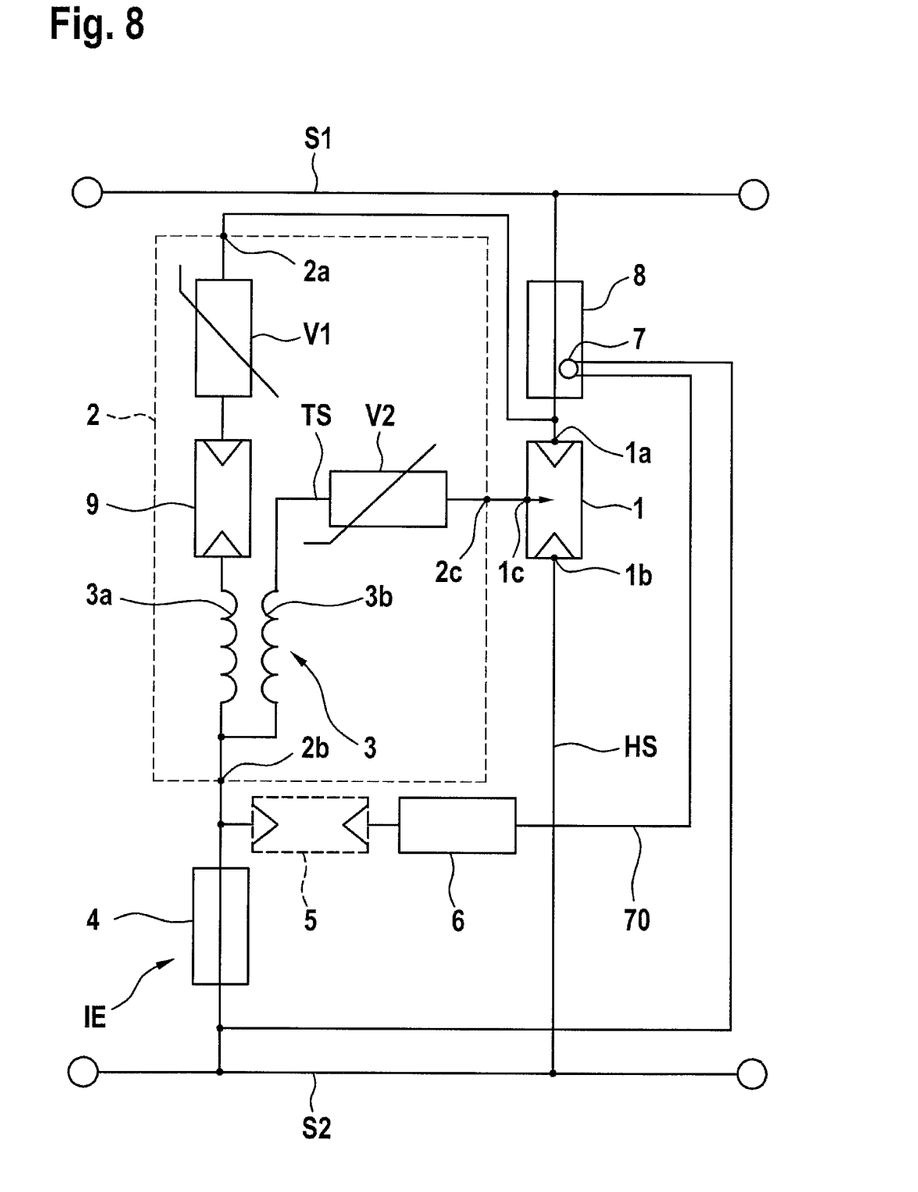
FIG. 8 shows a circuit diagram for explaining a lightning protection spark gap assembly according to an eighth embodiment of the present invention.

FIG. 8 shows a circuit diagram for explaining a lightning protection spark gap assembly according to an eighth embodiment of the present invention.

The eighth embodiment is constructed in a similar manner to the first embodiment, wherein an electrical indicator device IE is provided instead of a mechanical indicator device I or 4, 10 and a switch device 11.

If the trigger circuit 2 is overloaded with an excessively high current, an excessively long current flow duration or excessive heating of the components, the fusible link 4 responds. The fusible link 4 may also age as a result of frequent pulses and loads, in particular in the case of a fusible conductor or its fastening using low-temperature solder, with the result that a response according to a state of wear of the trigger circuit 2 and of the lightning protection spark gap 1 is also possible. When the fusible link 4 responds, the trigger current path TS is interrupted with respect to the driving voltage of the network. If a corresponding bypass with the bridge igniter 7 directly or with voltage-switching elements 5 and possibly components, for example resistors, 6 for influencing the current level and therefore the electrical delay of the triggering is connected in parallel with the fusible link 4, the bridge igniter 7 and therefore the triggerable fusible link device 8 can be triggered with a delay after the fusible link 4 has responded.

With this type of triggering, it should be noted that, when influencing the current load of the auxiliary wire of the bridge igniter 7 and therefore the reaction time depends directly or indirectly on the network conditions. In the case of a voltage-switching component 9 in the trigger current path TS, the current flow may already be interrupted, possibly at a current zero crossing, before at the response of the bridge igniter 7, with the result that the circuit becomes effective only when the voltage-switching element 9 responds again, that is to say in the case of a subsequent overvoltage.

Although the present invention has been completely described above on the basis of preferred exemplary embodiments, it is not restricted thereto, but rather can be modified in various ways.

The embodiments show that, in addition to the activation via the main current path and/or the trigger current path, a multiplicity of further possibilities for activating the bridge igniter on account of aging caused by erosion of materials which emit hard gas, for example, are possible. It goes without saying that other components of the lightning protection spark gap which are exposed to erosion, deformation, pressure effects or thermal loading can also be used in a similar manner to activate the switch device or to directly generate a current flow through the bridge igniter.

The bridge igniter can therefore be triggered on the basis of pulse current loads or a follow current load in the case of "erroneous" load values by actuating one or more switch devices.

In addition to directly assessing the current or a variable directly dependent thereon, it goes without saying that further conventional criteria, such as temperature changes, pressure changes, voltage changes or force effects, can additionally also be used to activate the bridge igniter.

In particular, the indicator device is not restricted to the described embodiments, but rather can be varied in order to perform the defined functions. The triggerable fusible link device is also not restricted to a fusible link device which can be triggered by a bridge igniter.

Although the above embodiments are therefore indicator devices in the form of mechanical switching devices, electronic or electrical switch devices and components can also be provided and can be used to implement the functions mentioned.

The invention claimed is:

1. A lightning protection spark gap assembly having:
   a lightning protection spark gap (1; 1'; 1") having a first main connection (1a) and a second main connection (1b);
   wherein a first voltage line (S1) of a supply network is connectable to the first main connection (1a) and a second voltage line of the supply network is connectable to the second main connection (1b);
   a triggerable fusible link device (8) which is connectable between the first or second voltage line (S1, S2) and the corresponding main connection (1, 1b) of the lightning protection spark gap (1; 1');
   wherein at least one current path (TS; HS) leading via the lightning protection spark gap (1; 1'; 1") is formable during operation between the first voltage line (S1) and the second voltage line (S2);
   an indicator device (I; I'; IE) for capturing a current profile in the current path (TS; HS) or a corresponding portion of the current profile in the current path (TS; HS) and for triggering the fusible link device (8) with an electrical or mechanical delay when the captured current profile in the current path (TS; HS) or the corresponding portion of the current profile in the current path (TS; HS) satisfies a predefined criterion;
   wherein the triggering of the fusible link device (8) is delayed by a predefined period which is selected in such a manner that a pulse current has substantially decayed before the fusible link device (8) is triggered;
   wherein the fusible link device (8) has a bridge igniter (7) which is usable to trigger the fusible link.

2. The lightning protection spark gap assembly as claimed in claim 1, which has a trigger connection (1c), wherein the at least one current path (TS; HS) comprises a trigger current path (TS) which leads via the trigger connection (1c).

3. The lightning protection spark gap assembly as claimed in claim 2, wherein the indicator device (IE) has an indicator fuse (4), which is usable to decouple the trigger current path (TS) from one of the first or second voltage line (S1, S2), and an electrically delaying bypass (5, 6) is connected from the other of the first or second voltage line (S1, S2) via the triggerable fusible link device (8), with the result that the fusible link device (8) is triggerable in the decoupled state.

4. The lightning protection spark gap assembly as claimed in claim 2, wherein the indicator device (I; I') comprises a first indicator device (I) for capturing a current profile in the trigger current path (TS) or a corresponding portion of the current profile in the trigger current path (TS) and for triggering the fusible link device (8) with a mechanical delay via a mechanical switch device (11) when the captured current profile in the trigger current path (TS) or the corresponding portion of the current profile in the trigger current path (TS) satisfies a predefined first criterion.

5. The lightning protection spark gap assembly as claimed in claim 1, wherein the at least one current path comprises a main current path (HS) which leads via the first main connection (1a) and the second main connection (1b).

6. The lightning protection spark gap assembly as claimed in claim 5, wherein the indicator device (I; I') comprises a second indicator device (I') for capturing a current profile in the main current path (HS) or a corresponding portion of the current profile in the main current path (HS) and for triggering the fusible link device (8) with a mechanical delay via the mechanical switch device (11) when the captured current profile in the main current path (HS) or the corresponding portion of the current profile in the main current path (HS) satisfies a predefined second criterion.

7. The lightning protection spark gap assembly as claimed in claim 1, wherein the indicator device (I; I') has an indicator fuse (10) which is usable to actuate a mechanical actuator (S), wherein the switch device (11) is closeable by the mechanical actuator (S) in order to trigger the fusible link device (8).

8. The lightning protection spark gap assembly as claimed in claim 7, wherein a frequency-dependent current divider (4') is connected in parallel with the indicator fuse (10).

9. The lightning protection spark gap assembly as claimed in claim 7, wherein a further indicator fuse (4) is connected in parallel with the indicator fuse (10).

10. The lightning protection spark gap assembly as claimed in claim 1, wherein the current level and the current duration of the current profile or of the corresponding portion of the current profile are included in the predetermined criterion.

11. The lightning protection spark gap assembly as claimed in claim 9, wherein the current level is included quadratically and the current duration is included linearly in the predefined criterion or the first and/or second predefined criterion.

12. The lightning protection spark gap assembly as claimed in claim 1, wherein the predefined period is in the range of 1 ms to 5 ms.

13. The lightning protection spark gap assembly as claimed in claim 1, wherein the switch device (11) for triggering the fusible link device (8) is closeable by an indicator device (I", I''') for a secondary parameter of the lightning protection spark gap (1; 1').

14. The lightning protection spark gap assembly as claimed in claim 12, wherein the secondary parameter of the lightning protection spark gap (1; 1') is one or more of light properties of the arc, temperature, pressure and extent.

15. The lightning protection spark gap assembly as claimed in claim 12, wherein the secondary parameter of the lightning protection spark gap (1; 1') is one or more of intensity and spectral properties of the arc.

16. The lightning protection spark gap assembly as claimed in claim 1, wherein the lightning protection spark gap (1") has, beside an arc region (41), at least one region (38, 39) which emits hard gas and in which a probe device (K1, K2, D; K0; K1, K2) is provided as a further indicator device (IK; IK'; IK"), which probe device enables the fusible link device (8) to be triggered when the region (38, 39) which emits hard gas is degraded such that the arc is electrically contactable with the probe device (K1, K2, D; K0; K1, K2).

17. The lightning protection spark gap assembly as claimed in claim 16, wherein the probe device (K1, K2, D; K0; K1, K2) has a first contact (K1) and a second contact (K2) which is arranged at a distance from the first contact (K1).

18. The lightning protection spark gap assembly as claimed in claim 17, wherein a fusible wire (D) is provided between the first contact (K1) and the second contact (K2).

19. The lightning protection spark gap assembly as claimed in claim 16, wherein the probe device (K1, K2, D; K0; K1, K2) has an individual contact (K0).

20. The lightning protection spark gap assembly as claimed in claim 13, wherein the fusible link device (8) is connected to the probe device (K1, K2, D; K0; K1, K2) in such a manner that it is directly triggerable by a voltage tapped off from the arc at the probe device (K1, K2, D; K0; K1, K2).

21. A method for operating a lightning protection spark gap assembly having:
   a lightning protection spark gap (1; 1'; 1") having a first main connection (1a) and a second main connection (1b);
   wherein a first voltage line (S1) of a supply network is connectable to the first main connection (1a) and a second voltage line of the supply network is connectable to the second main connection (1b);
   a fusible link device (8) which is triggerable by a bridge igniter (7) and is connectable between the first or second voltage line (S1, S2) and the corresponding main connection (1, 1b) of the lightning protection spark gap (1; 1');
   wherein at least one current path (TS; HS) leading via the lightning protection spark gap (1; 1'; 1") is formable during operation between the first voltage line (S1) and the second voltage line (S2);
   wherein the method has the steps of:
   capturing a current profile in the current path (TS; HS) or a corresponding portion of the current profile in the current path (TS; HS) and triggering the fusible link device (8) with an electrical or mechanical delay when the captured current profile in the current path (TS; HS) or the corresponding portion of the current profile in the current path (TS; HS) satisfies a predefined criterion;
   wherein the triggering of the fusible link device (8) is delayed by a predefined period which is selected in such a manner that a pulse current has substantially decayed before the fusible link device (8) is triggered.

22. The method as claimed in claim 21, wherein the lightning protection spark gap (1; 1'; 1") has a trigger connection (1c), and wherein the at least one current path comprises a trigger current path (TS) which leads via the trigger connection (1c).

23. The method as claimed in claim 21, comprising the steps of: capturing a current profile in the trigger current path or a corresponding portion of the current profile in the trigger current path and triggering the fusible link device (8) with a mechanical delay via the mechanical switch device (11) when the captured current profile in the trigger current path or the corresponding portion of the current profile in the trigger current path satisfies a predefined first criterion.

24. The method as claimed in claim 21 wherein the at least one current path comprises a main current path which leads via the first main connection (1a) and the second main connection (1b).

25. The method as claimed in claim 23, comprising the steps of: capturing a current profile in the main current path or a corresponding portion of the current profile in the main current path and triggering the fusible link device (8) with a mechanical delay via the mechanical switch device (11) when the captured current profile in the main current path or the corresponding portion of the current profile in the main current path satisfies a predefined second criterion.

26. A lightning protection spark gap assembly having:
   a lightning protection spark gap (1; 1'; 1") having a first main connection (1a) and a second main connection (1b);
   wherein a first voltage line (S1) of a supply network is connectable to the first main connection (1a) and a second voltage line of the supply network is connectable to the second main connection (1b);
   a triggerable fusible link device (8) which is connectable between the first or second voltage line (S1, S2) and the corresponding main connection (1, 1b) of the lightning protection spark gap (1; 1');
   wherein at least one current path (TS; HS) leading via the lightning protection spark gap (1; 1'; 1") is formable during operation between the first voltage line (S1) and the second voltage line (S2);
   wherein the lightning protection spark gap (1") has, in beside an arc region (41), at least one region (38, 39) which emits hard gas and in which a probe device (K1, K2, D; K0; K1, K2) is provided as an indicator (IK; IK'; IK"), which probe device enables the fusible link device (8) to be triggered when the region (38, 39)

which emits hard gas is degraded such that the arc is electrically contactable with the probe device (K1, K2, D; K0; K1, K2).

27. The lightning protection spark gap assembly as claimed in claim 26, wherein the probe device (K1, K2, D; K0; K1, K2) has a first contact (K1) and a second contact (K2) which is arranged at a distance from the first contact (K1).

28. The lightning protection spark gap assembly as claimed in claim 27, wherein a fusible wire (D) is provided between the first contact (K1) and the second contact (K2).

29. The lightning protection spark gap assembly as claimed in claim 26, wherein the probe device (K1, K2, D; K0; K1, K2) has an individual contact (K0).

30. The lightning protection spark gap assembly as claimed in claim 26, wherein the fusible link device (8) is connected to the probe device (K1, K2, D; K0; K1, K2) in such a manner that it is directly triggerable by a voltage tapped off from the arc at the probe device (K1, K2, D; K0; K1, K2).

\* \* \* \* \*